US00RE50005E

(19) United States
(12) Reissued Patent
Trivelpiece et al.

(10) Patent Number: US RE50,005 E
(45) Date of Reissued Patent: Jun. 11, 2024

(54) SYSTEMS AND METHODS FOR DETECTING EVENTS BASED ON WIRELESS SIGNAL DEGREDATION

(71) Applicant: Johnson Controls Tyco IP Holdings LLP, Milwaukee, WI (US)

(72) Inventors: Craig E. Trivelpiece, Mission Viejo, CA (US); Robert C. Hall, Jr., Brown Deer, WI (US); Timothy C. Gamroth, Dousman, WI (US)

(73) Assignee: Johnson Controls Tyco IP Holdings LLP, Milwaukee, WI (US)

(21) Appl. No.: 17/825,834

(22) Filed: May 26, 2022

Related U.S. Patent Documents

Reissue of:
(64) Patent No.: 10,661,109
Issued: May 26, 2020
Appl. No.: 16/560,769
Filed: Sep. 4, 2019

U.S. Applications:
(63) Continuation of application No. 15/999,263, filed on Aug. 17, 2018, now Pat. No. 10,441,832.

(51) Int. Cl.
*A62C 37/40* (2006.01)
*A62C 3/02* (2006.01)
(Continued)

(52) U.S. Cl.
CPC ..... *A62C 37/40* (2013.01); *A62C 3/0214* (2013.01); *A62C 99/0072* (2013.01);
(Continued)

(58) Field of Classification Search
CPC ... A62C 37/40; A62C 3/0214; A62C 99/0072; A62C 3/00; G08B 17/06; G08B 17/10; G08B 25/007; G08B 25/10
See application file for complete search history.

(56) References Cited

U.S. PATENT DOCUMENTS 4,695,734 A * 9/1987 Honma ..... G01N 21/274 250/573
5,223,815 A * 6/1993 Rosenthal ..... G08B 13/1427 340/531

(Continued)

OTHER PUBLICATIONS

"Realm of Wireless RF communication—All you need to know", https://www.nagarro.com/en/blog/wireless-rf-communication, accessed Sep. 13, 2023, 6 pages.*

(Continued)

*Primary Examiner* — Jeffrey D Carlson
(74) *Attorney, Agent, or Firm* — Foley & Lardner LLP

(57) ABSTRACT

A method for detecting an event in or around a building. The method includes recording a baseline signal characteristic that characterizes a wireless signal transmitted between devices in or around the building during a baseline time period and recording a second signal characteristic that characterizes the wireless signal during a second time period after the baseline time period. An event in or around the building is detected in response to a determination that the second signal characteristic is abnormal relative to the baseline signal characteristic, the event degrading the wireless signal during the second time period. An alarm is triggered in response to detecting the event.

34 Claims, 10 Drawing Sheets

(51) Int. Cl.

| | |
|---|---|
| ***A62C 99/00*** | (2010.01) |
| ***G08B 17/06*** | (2006.01) |
| ***G08B 17/10*** | (2006.01) |
| ***G08B 25/00*** | (2006.01) |
| ***G08B 25/10*** | (2006.01) |

(52) U.S. Cl.
CPC ..... *G08B 17/06* (2013.01); *G08B 17/10* (2013.01); *G08B 25/007* (2013.01); *G08B 25/10* (2013.01)

(56) References Cited

U.S. PATENT DOCUMENTS

| | | | | |
|---|---|---|---|---|
| 5,612,676 | A | 3/1997 | Plimpton et al. | |
| 8,115,646 | B2 | 2/2012 | Tanielian et al. | |
| 9,173,120 | B2 * | 10/2015 | Dimou | H04W 24/08 |
| 10,353,934 | B1 | 7/2019 | Mehta et al. | |
| 10,409,843 | B1 | 9/2019 | Mehta et al. | |
| 10,441,832 | B1 | 10/2019 | Trivelpiece et al. | |
| 10,661,109 | B2 | 5/2020 | Trivelpiece et al. | |
| 2010/0168546 | A1 | 7/2010 | Kamath et al. | |
| 2011/0032114 | A1 | 2/2011 | Egawa et al. | |
| 2013/0154840 | A1 * | 6/2013 | Lynar | G08B 17/06 340/593 |
| 2014/0009281 | A1 * | 1/2014 | Pichard | G08B 25/10 340/539.1 |
| 2014/0293801 | A1 * | 10/2014 | Dimou | H04W 24/08 370/252 |
| 2015/0018987 | A1 * | 1/2015 | Hederstierna | H04W 4/70 700/90 |
| 2016/0071402 | A1 * | 3/2016 | Chiarizio | G08B 27/008 340/539.17 |
| 2016/0225240 | A1 | 8/2016 | Voddhi et al. | |
| 2016/0255423 | A1 * | 9/2016 | Suzuki | H04Q 9/00 340/870.16 |
| 2017/0098368 | A1 * | 4/2017 | Gruber | G08B 25/14 |
| 2017/0249819 | A1 * | 8/2017 | Uchida | G08B 17/10 |
| 2018/0122221 | A1 | 5/2018 | Norton et al. | |
| 2018/0195749 | A1 | 7/2018 | Sinha et al. | |
| 2018/0225943 | A1 | 8/2018 | Meyer | |
| 2018/0359137 | A1 * | 12/2018 | Vaderna | H04L 41/0609 |
| 2018/0365975 | A1 | 12/2018 | Xu et al. | |
| 2019/0247689 | A1 | 8/2019 | Trivelpiece et al. | |
| 2019/0247690 | A1 | 8/2019 | Trivelpiece et al. | |
| 2019/0247691 | A1 * | 8/2019 | Trivelpiece | A62C 37/10 |
| 2020/0188718 | A1 | 6/2020 | Trivelpiece et al. | |
| 2020/0383284 | A1 | 12/2020 | Larsen | |

OTHER PUBLICATIONS

"IEEE 802.11", https://en.wikipedia.org/wiki/IEEE_802.11, accessed Sep. 13, 2023, 19 pages.*

* cited by examiner

SYSTEMS AND METHODS FOR DETECTING EVENTS BASED ON WIRELESS SIGNAL DEGREDATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[This application is a continuation of U.S. patent application Ser. No. 15/999,263, filed Aug. 17, 2018, the entire disclosure of which is incorporated by reference herein.] *This application is an application for reissue of U.S. Pat. No. 10,661,109, which issued on May 26, 2020, from U.S. application Ser. No. 16/560,769 filed Sep. 4, 2019, which is a continuation of U.S. application Ser. No. 15/999,263 filed Aug. 17, 2018 (now U.S. Pat. No. 10,441,832), all of which are incorporated herein by reference in their entireties.*

BACKGROUND

The present disclosure relates generally to building control systems and more particularly to a Fire Detection System (FDS) for a building. A FDS is, in general, a system of devices configured to control, monitor, and manage equipment in or around a building or building area to detect and suppress fires. A FDS can include, for example, a fire alerting system, a fire suppression system, and any other system that is capable of managing building fire safety functions or devices, or any combination thereof.

SUMMARY

One implementation of the present disclosure is a method for detecting an event in or around a building, the method includes recording a baseline signal characteristic that characterizes a wireless signal transmitted between devices in or around the building during a baseline time period. The method further includes recording a second signal characteristic that characterizes the wireless signal during a second time period after the baseline time period. The method further includes detecting an event in or around the building in response to a determination that the second signal characteristic is abnormal relative to the baseline signal characteristic, the event degrading the wireless signal during the second time period. The method further includes triggering an alarm in response to detecting the event.

In some embodiments, the wireless signal is within a frequency range compliant with IEEE 802.11 Wi-Fi communications specifications or IEEE 802.15.4-based specifications.

In some embodiments, detecting the event includes identifying a building location located between a first device from which the wireless signal is transmitted and a second device at which the wireless signal is received. The event further includes determining that the event is occurring within the building location.

In some embodiments, the event includes at least one of a fire within the building or an increased level of water vapor within the building.

In some embodiments, the second signal characteristic is determined to be abnormal relative to the baseline signal characteristic if the second signal characteristic comprises at least one of a degradation in signal strength, a degradation in link quality, or a degradation in bit rate relative to the baseline signal characteristic.

In some embodiments, the method further includes observing the baseline signal characteristic and the second signal characteristic at a plurality of locations throughout the building. The method further includes transmitting the baseline signal characteristic and the second signal characteristic observed at the plurality of locations to a controller.

In some embodiments, the controller comprises at least one of a building management system (BMS) controller or a fire system controller.

Another implementation of the present disclosure is a system for detecting an event within a building. The system includes a wireless network comprising a plurality of wireless devices distributed throughout the building. The wireless network is configured to record a baseline signal characteristic that characterizes a wireless signal transmitted between the plurality of wireless devices during a baseline time period. The wireless network is further configured to record a second signal characteristic that characterizes the wireless signal during a second time period after the baseline time period. The system further includes a controller configured to detect an event in or around the building in response to a determination that the second signal characteristic is abnormal relative to the baseline signal characteristic, the event degrading the wireless signal during the second time period. The controller is further configured to trigger an alarm in response to detecting the event within the building.

In some embodiments, the wireless signal is a frequency range compliant with IEEE 802.11 Wi-Fi communications specifications or IEEE 802.15.4-based specifications.

In some embodiments, the controller is further configured to identify a building location located between a first device from which the wireless signal is transmitted and a second device at which the wireless signal is received. The controller is further configured to determine that the event is occurring within the building location.

In some embodiments, the event comprises at least one of a fire within the building or an increased level of water vapor within the building.

In some embodiments, the second signal characteristic is determined to be abnormal relative to the baseline signal characteristic if the second signal characteristic comprises at least one of a degradation in signal strength, a degradation in link quality, or a degradation in bit rate relative to the baseline signal characteristic.

In some embodiments, the plurality of wireless devices are configured to observe the baseline signal characteristic and the second signal characteristic at a plurality of locations throughout the building. The wireless devices are further configured to transmit the baseline signal characteristic and the second signal characteristic observed at the plurality of locations to the controller.

In some embodiments, the controller comprises at least one of a building management system (BMS) controller or a fire system controller.

Another implementation of the present disclosure is a method for detecting an event in or around a building. The method includes recording a baseline signal characteristic that characterizes a wireless signal transmitted between devices in or around the building during a baseline time period. The method further includes recording a second signal characteristic that characterizes the wireless signal during a second time period after the baseline time period. The method further includes detecting an event in or around the building in response to a determination that the second signal characteristic is abnormal relative to the baseline signal characteristic, the event degrading the wireless signal during the second time period.

In some embodiments, the wireless signal is within a frequency range compliant with IEEE 802.11 Wi-Fi communications specifications or IEEE 802.15.4-based specifications.

In some embodiments, detecting the event comprises identifying a building location located between a first device from which the wireless signal is transmitted and a second device at which the wireless signal is received. The event further comprises determining that the event is occurring within the building location.

In some embodiments, the event comprises at least one of a fire within the building or an increased level of water vapor within the building.

In some embodiments, the second signal characteristic is determined to be abnormal relative to the baseline signal characteristic if the second signal characteristic comprises at least one of a degradation in signal strength, a degradation in link quality, or a degradation in bit rate relative to the baseline signal characteristic.

In some embodiments, the method further comprises observing the baseline signal characteristic and the second signal characteristic at a plurality of locations throughout the building. The method further comprises transmitting the baseline signal characteristic and the second signal characteristic observed at the plurality of locations to a controller.

Figure 8:
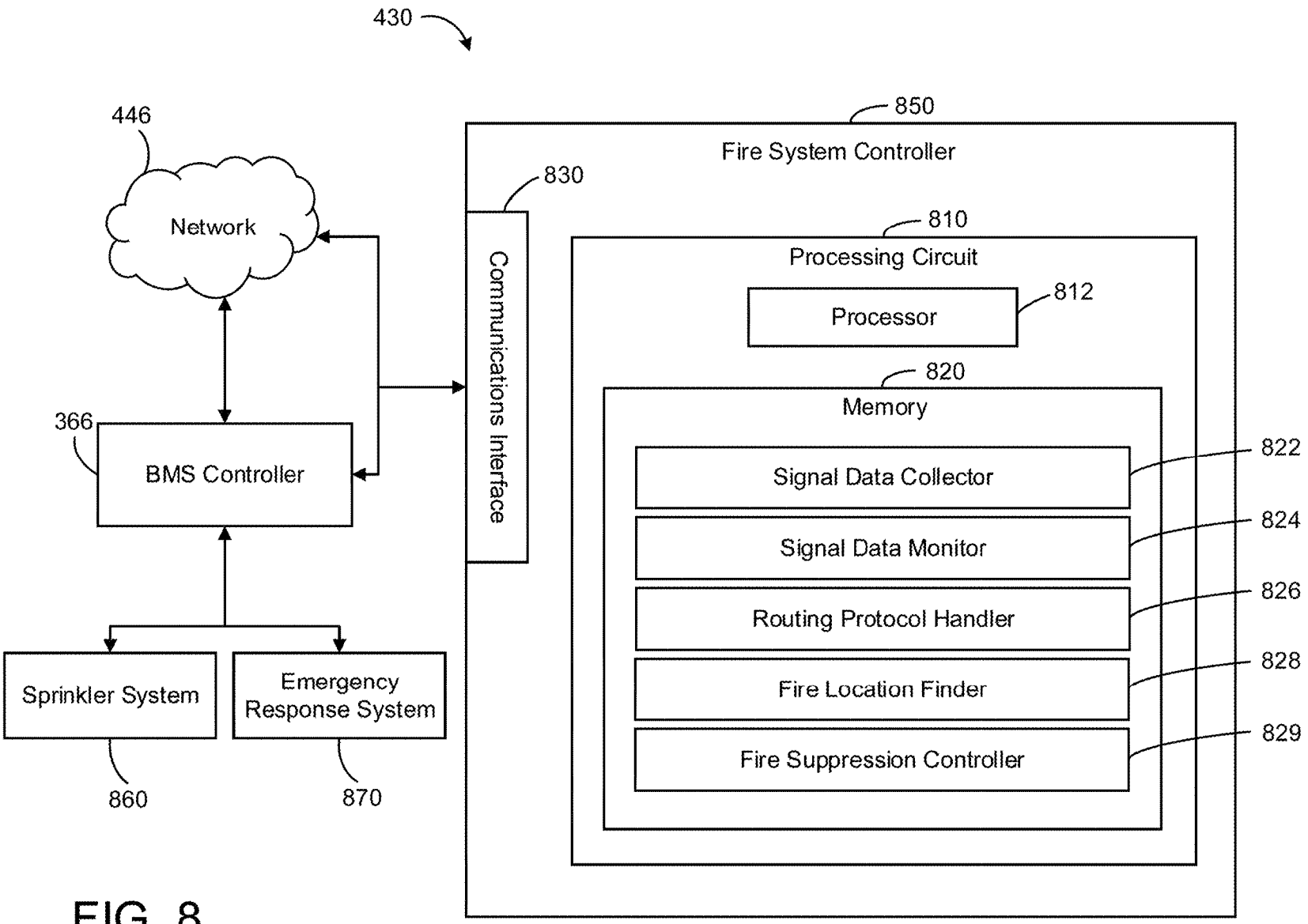
FIG. 8 is a block diagram of a fire safety system which can be used as part of the BMS of FIG. 4, according to some embodiments.

IG. 9 is a flowchart of a process of detecting fire through a network of radio transceivers that can be performed by the fire safety system of FIG. 8, according to some embodiments.

Figure 10:
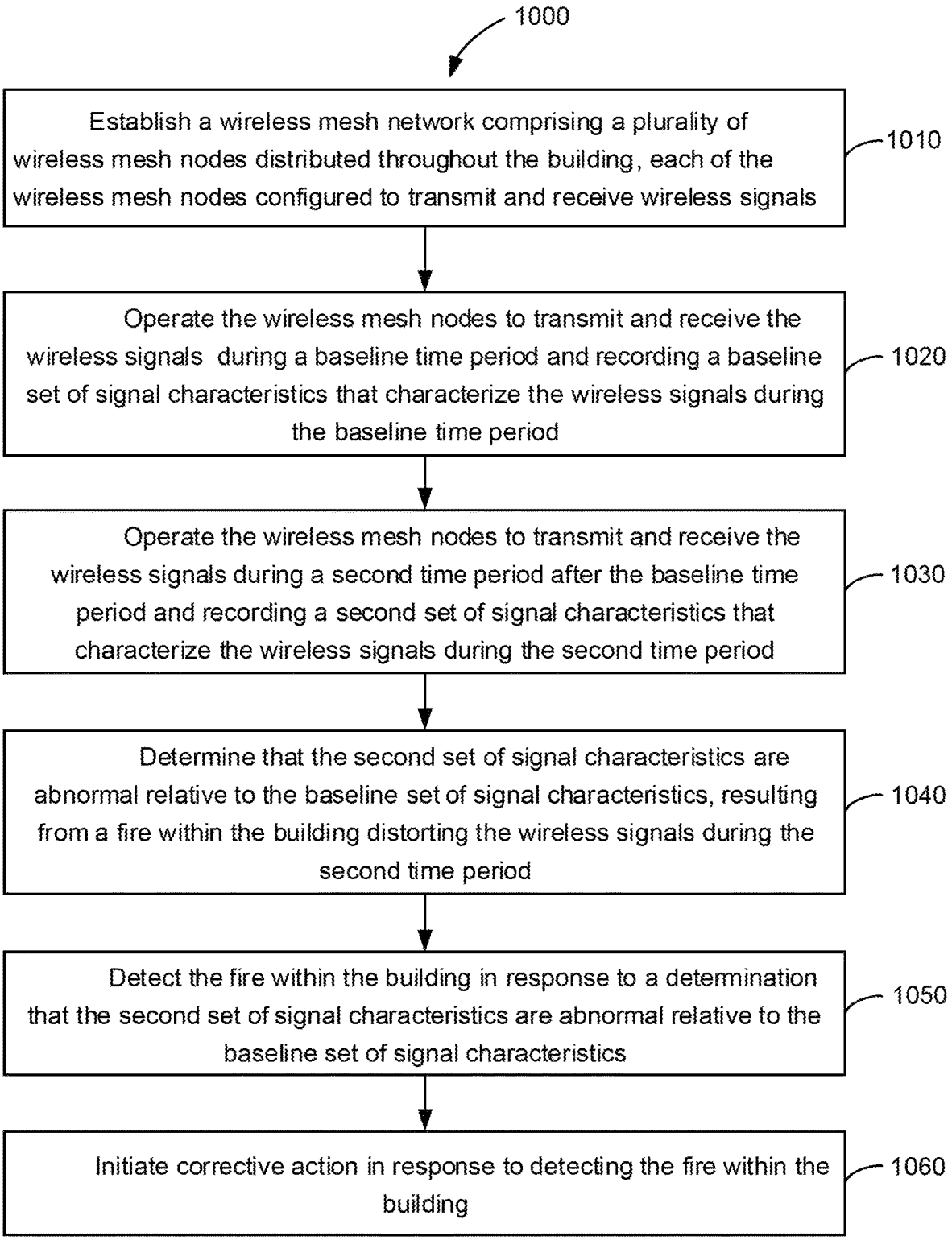

FIG. 10 is a flowchart of a process for a detecting and suppressing fires which can be performed by the fire safety system of FIG. 8, according to some embodiments.

DETAILED DESCRIPTION

Overview

Referring generally to the FIGURES, a building management system (BMS) including a wireless mesh network used for fire detection and suppression is shown, according to some embodiments. The wireless mesh network is configured to transmit and receive data and route that data to a controller for analysis.

A wireless mesh is a type of network that allows packets of data to transport to and from the plurality of wireless mesh nodes inside of the network. Because each wireless mesh node has the capacity to transmit and receive information, a single wireless mesh node may only need to be connected to a server. This allows a wireless system to be implemented throughout a building comprising of plurality of wireless mesh nodes. These wireless mesh nodes may be configured to transmit and receive radio signals.

A natural phenomenon occurs that allows the method of monitoring the radio signals capable of detecting fires. Since water is resonant at a frequency of approximately 2.45 GHz, it has the capacity to absorb radio energy based upon the excitation of the water molecules. Monitoring a wireless mesh network operating at approximately 2.45 GHz, wherein the temperature of the environment is not significantly increasing or decreasing the amount of water vapor in the air, a baseline reading may be recorded. Assuming a fire were to occur in the building, the significant increase in temperature and the effects of combustion may release water molecules into the air that previously resided in the building materials (e.g. wood). The increase in water molecules in the air would allow for the increase in radio energy absorbed between the wireless mesh nodes by the water molecules and, when compared to the baseline reading, indicate a fire occurrence in the portion of the building where the signal was degraded.

Building Management System

Figure 1:
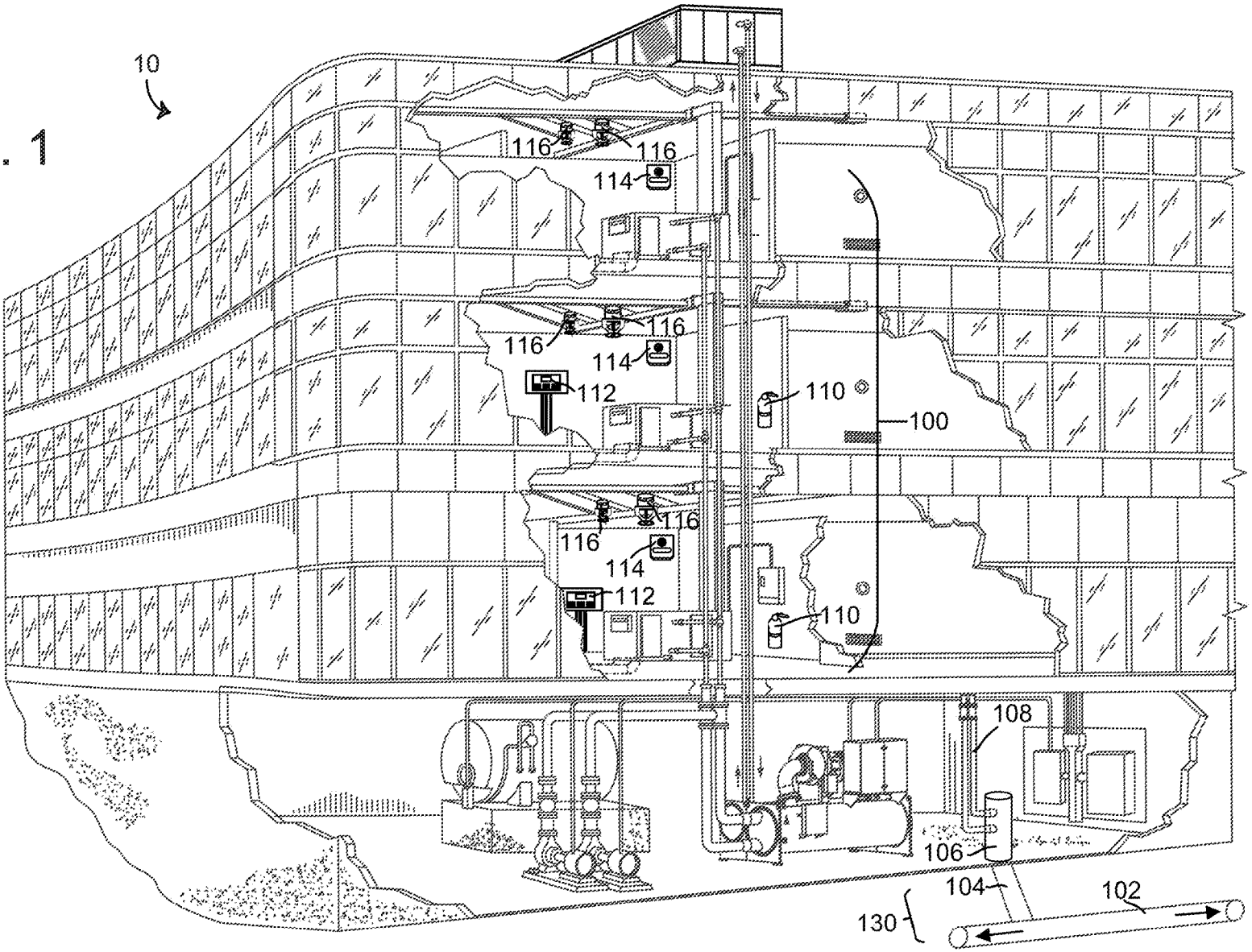
FIG. 1 is a drawing of a building equipped with a building management system (BMS) and a fire system, according to some embodiments.

Referring now to FIGS. 1-4, an example building management system (BMS) and fire suppression system in which the systems and methods of the present disclosure can be implemented are shown, according to an example embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a fire suppression system, a security system, a lighting system, a fire detection system, any other system that is capable of managing building functions or devices, or any combination thereof.

The BMS that serves building 10 includes a fire system 100. Fire system 100 can include a plurality of fire suppression devices (e.g., notification devices, sprinklers, fire alarm control panels, fire extinguishers, water systems etc.) configured to provide detection, suppression, notification to building occupants, or other services for building 10. For example, fire system 100 is shown to include water system 130. Water system 130 can act as the system in which building 10 receives water from a city line 102 through a building line 104 to suppress fires. In some embodiments, a main water line 106 can be the dominant piping system that distributes water throughout one or more of the building floors in building 10. This can be done through a piping system 108.

Fire system 100 can also include fire detection devices, such as sprinklers 116, fire notification devices 114, fire alarm control panels 112, and fire extinguishers 110. Sprinklers 116 may be connected to piping system 108 and serve as one of the corrective actions taken by the BMS to suppress fires. In some embodiments, sprinklers 116 can engage in suppressive action using dry agents (nitrogen, air, etc.) instead of water. Fire extinguishers 110 can be any portable devices capable of discharging a fire suppressing agent (e.g., water, foam, gas, etc.) onto a fire. Building 10 may include fire extinguishers 110 on several floors in multiple rooms.

Fire notification devices 114 can be any devices capable of relaying audible, visible, or other stimuli to alert building occupants of a fire or other emergency condition. In some embodiments, fire notification devices 114 are powered by Initiating Device Notification Alarm Circuit (IDNAC) power from fire alarm control panel 112. In other embodiments, fire notification devices 114 may be powered by a DC power source (e.g. a battery). In other embodiments, fire notification devices 114 can be powered by an external AC power source (described in greater detail with reference to improved notification device 530 shown in FIG. 5). Fire notification devices 114 can include a light notification module and a sound notification module. The light notification module can be implemented as any component in fire notification devices 114 that alerts occupants of an emergency by emitting visible signals. In some embodiments, fire notification devices 114 emit strobe flashes at least 60 flashes per minute to alert occupants of building 10 of an emergency situation. A sound notification module can be any component in fire notification devices 114 that alerts occupants of an emergency by emitting audible signals. In some embodiments, fire notification devices 114 emit signals ranging from approximately 500 Hz (low frequency) to approximately 3 kHz (high frequency).

Fire alarm control panel 112 can be any computer capable of collecting and analyzing data from the fire notification system (e.g., building controllers, conventional panels, addressable panels, etc.). In some embodiments, fire alarm control panel 112 is directly connected to fire notification device 114 through IDNAC power. In some embodiments, fire alarm control panel 112 can be communicably connected to a network for furthering the fire suppression process, including initiating corrective action in response to detection of a fire. In other embodiments, sensors transmitting data to fire alarm control panel 112 (temperature sensors, smoke sensors, humidity sensors, etc.) may be directly connected to sprinkler heads and will initiate the engagement of the sprinkler system independent of a command from fire alarm control panel 112.

Figure 2:
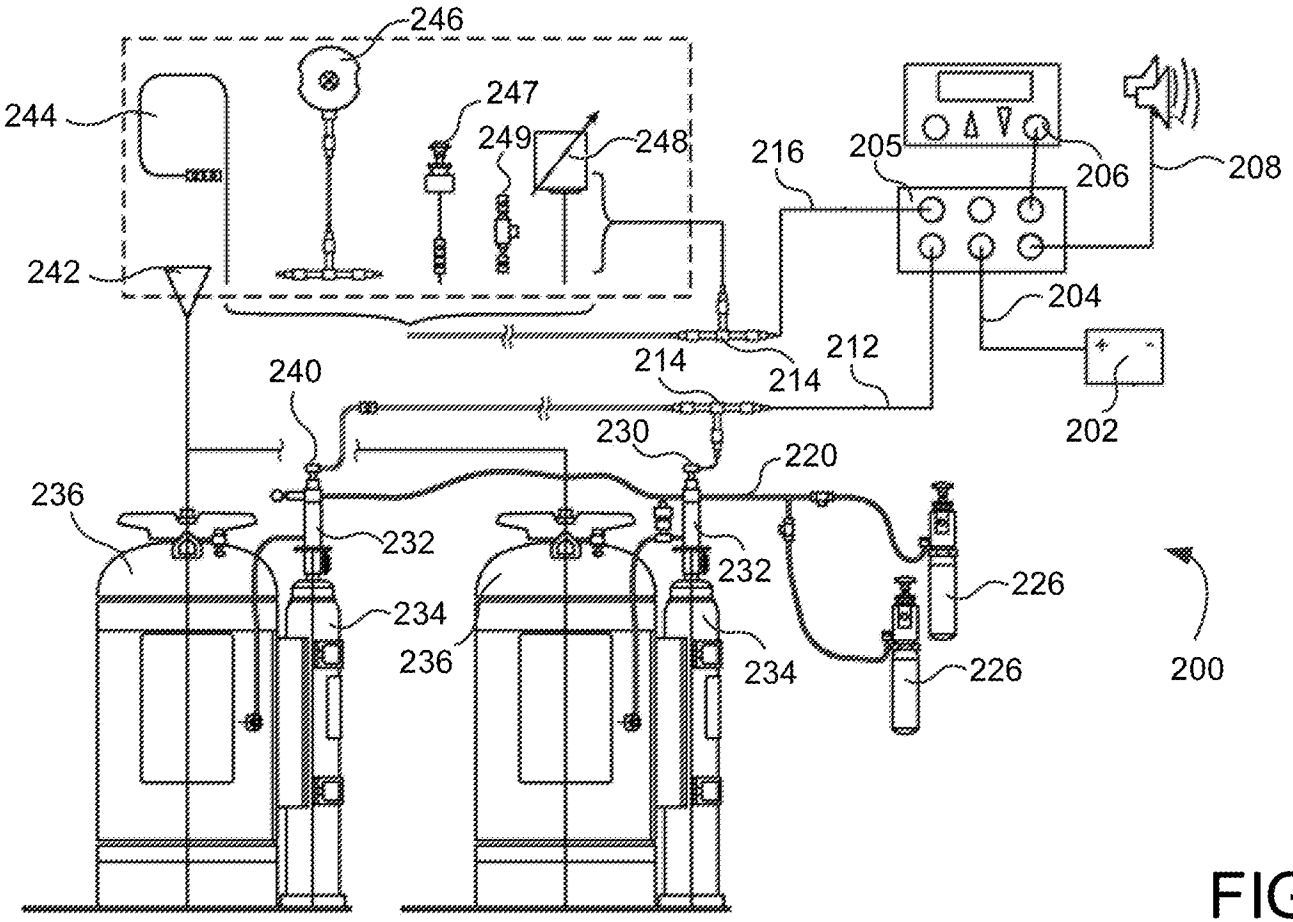
FIG. 2 is a schematic of a fire suppression system which can be used as part of the fire system of FIG. 1, according to some embodiments.

Referring now to FIG. 2, a schematic illustration of a suppression system 200 is shown, according to an exemplary embodiment. Suppression system 200 is shown to include one or more storage tanks 236 coupled to fixed nozzles 242. Storage tanks 236 and fixed nozzles 242 may act as the assemblies configured to suppress fires. In some embodiments, storage tank 236 includes a fire fighting agent (e.g., ware, chemicals, foam, etc.). Storage tanks 236 can include an attached pressurized cylinder 234 and rupturing device 232 to their respective tanks which are configured to pressurize storage tanks 236 for delivery of the fire fighting agent. The fire fighting agent can be configured to be under an operating pressure that can output to nozzle 242 to suppress a fire. Rupturing device 232 can be configured to puncture a rupture disc of a pressurized cylinder 234, where pressurized cylinder 234 may contain a pressurized gas (e.g., nitrogen) to pressurize storage tanks 236 for the delivery of the fire fighting agent.

To operate rupturing device 232, suppression system 200 can provide for automatic actuation and manual operation of rupturing device 232 to provide for respective automated and manual delivery of the fire fighting agent in response to detection of a fire. Rupturing device 232 (e.g., a rupturing or actuating device or assembly) may include a puncturing pin or member that is driven into the rupture disc of pressurized cylinder 234 for release of the pressurized gas. The puncturing pin of rupturing device 232 may be driven electrically or pneumatically to puncture the rupture disc of the pressurized cylinder 234.

In other embodiments, rupturing device 232 acts as an actuating device that includes a protracted actuation device (PAD) 240 for driving the puncturing pin of the assembly into the rupture disc. PAD 240 generally includes an electrically coupled rod or member that is disposed above the puncturing pin. When an electrical signal is delivered to PAD 240, the rod of PAD 240 is driven directly or indirectly into the puncturing pin which punctures the rupture disc of pressurized cylinder 234. An example of a potential pressurized cylinder assembly which can be used in system 200 is described in detail in U.S. Provisional Patent Application No. 61/704,551 and shows a known rupturing device for either manual and pneumatic or automatic electrical operation to drive a puncture pin. Suppression system 200 provides for automatic and manual operation of PAD 240. In some embodiments, suppression system 200 includes PADs and rupture discs. In other embodiments, suppression system 200 provides for electric manual operation of PAD 240 as explained in greater detail below. Suppression system 200 can further provide for one or more remote manual operating stations 226 to manually actuate suppression system 200. Manual operating stations 226 can rupture a canister of pressurized gas, (e.g., nitrogen at 1800 psi), to fill and pressurize an actuation line which in turn drives the puncturing pin of rupturing device 232 into the rupturing disc thereby actuating suppression system 200.

Still referring to FIG. 2, suppression system 200 is shown to include a centralized controller for automated and manual operation and monitoring of system 200. More specifically, suppression system 200 may include the centralized controller or an interface control module (ICM) 205. In some embodiments, a display device 206 is coupled to ICM 205. Display device 206 can display information to a user and provide for user input to ICM 205. An audio alarm or speaker 208 may also be coupled to ICM 205 to provide for an audio alert regarding the status of suppression system 200. In some embodiments, an audio alarm or sounder is incorporated into the housing of display device 206 and configured to operate in a wet environment.

To provide for fire detection and actuation of rupturing device (i.e., actuating device) 232 and the fire protection system, ICM 205 may include an input data bus 216 coupled to one or more detection sensors, an output data bus 212 coupled to PADs 240, and an input power supply bus 204 for powering ICM 205. The control and actuating signals as explained in greater detail below. Input bus 216 may provide for interconnection of digital and analog devices to the ICM 205; and in some embodiments includes one or more fire detection devices and preferably at least one manual actuating device 247. Suppression system 200 can include several analog and digital devices for various modes for fire detection including: (i) spot thermal detectors 249 to determine when the surrounding air exceeds a set temperature, (ii) linear detection wire 244 which conveys a detection signal from two wires that are brought into contact upon a separating insulation material melting in the presence of a fire, (iii) optical sensors 246 which differentiate between open flames and hydrocarbon signatures, and (iv) a linear pressure detector 248 in which pressure of an air line increases in the presence of sufficient heat. Manual actuating device 247 can be a manual push button which sends an actuating signal to ICM 20 for output of an electrical actuating signal along to PAD 240. Accordingly, suppression system 200 provides for manual actuation of system 200 via an electrical signal to PAD 240. Together the detection and manual actuating devices (i.e., spot thermal detector 249, linear detection wire 244, optical sensors 246, and linear pressure detector 248) define a detecting circuit of suppression system 200 of either an automatic or manual detection of a fire event.

Devices of input bus 216 may be interconnected by two or more interconnected connection cables which may include one or more sections of linear detection wire 244. The cables can be connected by connectors 214. The connection cable of input bus 216 can be coupled to ICM 205. The connection cables of input bus 216 and output bus 212 may define closed electrical circuits with the ICM 205. Accordingly, a bus may include one or more branch terminators (e.g., the end of a linear detection wire). Additionally, the detecting circuit can include an end of line element which terminates the physically furthest end of the input bus and monitors the detecting circuit of suppression system 200. The detection devices (i.e., spot thermal detector 249, linear detection wire 244, optical sensors 246, and linear pressure detector 248) may be digital devices for direct communication with ICM 205.

ICM 205 may be a programmable controller having a microprocessor or microchip.

ICM 205 may receive input signals on input bus 216 from the detection devices for processing and where appropriate, generating an actuating signal to PAD 240 along the output bus 212. Moreover, the processor can be configured for receiving feedback signals from each of the input and output buses to determine the status of the system and its various components. More specifically, ICM 205 may include internal circuitry to detect the status of the input bus, i.e., in a normal state, ground state, whether there is an open circuit, or whether there has been a signal for manual release.

Figure 3:
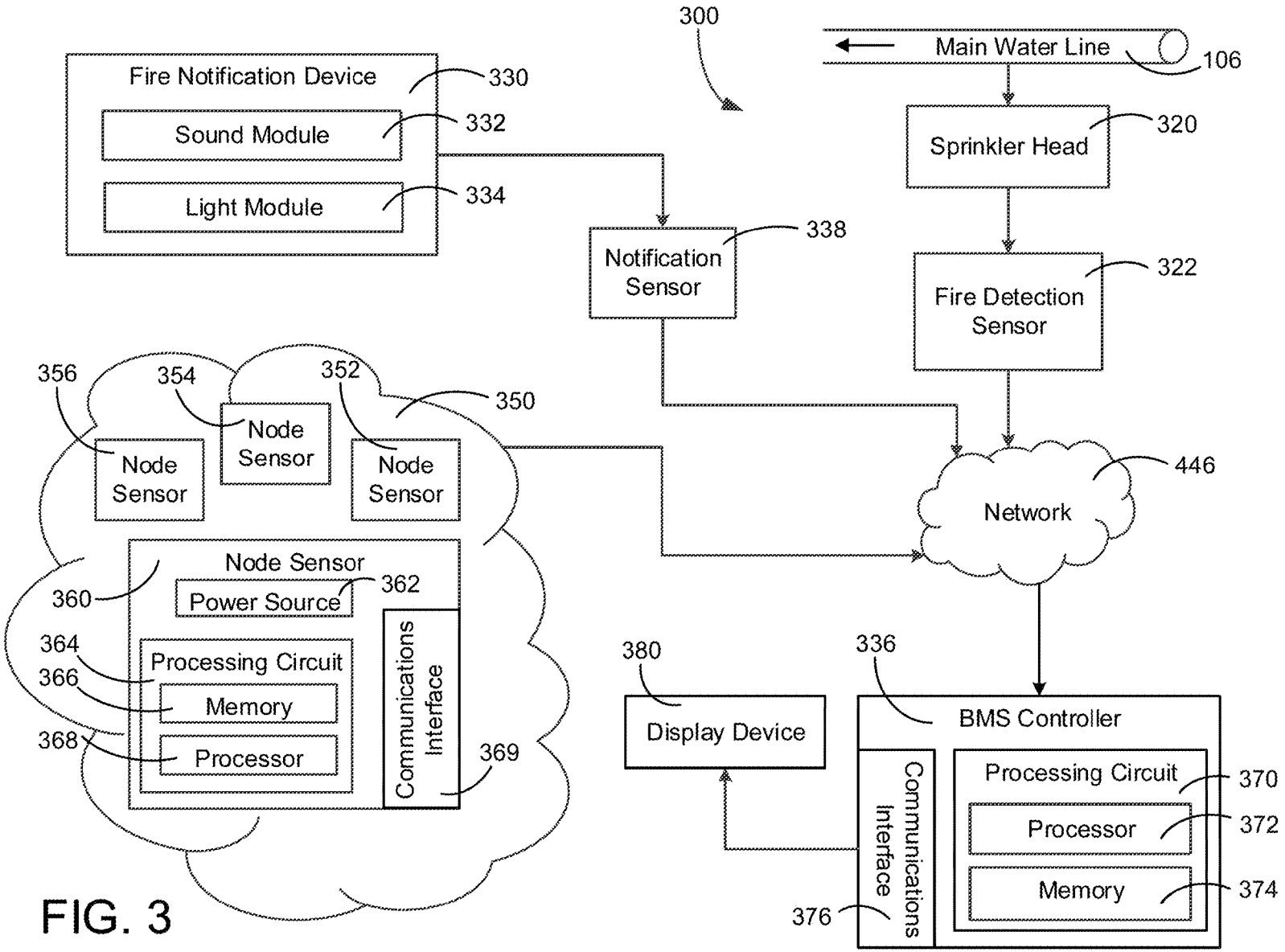
FIG. 3 is a block diagram of a fire detection system which can be used as part of the fire system of FIG. 1, according to some embodiments.

Referring now to FIG. 3, fire detection system 300 is shown, according to an exemplary embodiment. Fire detection system 300 can be included in the BMS inside of building 10 and may be included in fire system 100. Fire detection system 300 can be any type of system that analyzes data inputs (e.g., sensor data) to detect a fire. Fire detection system 300 is shown to include fire notification device 330, notification device 338, and network 446.

Fire notification device 330 can be any device capable of relaying an audible, visible, or other stimuli to alert building occupants of a fire or other emergency condition. Fire notification device 330 is shown to include a light notification module 334 and a sound notification module 332. Light notification module 334 can be implemented as any component in fire notification device 330 that alerts occupants of an emergency by emitting visible signals. In some embodiments, light notification module 334 emits strobe flashes at least 60 flashes per minute to alert occupants of building 10 of an emergency situation. Sound notification module 332 can be any component in fire notification device 330 that alerts occupants of an emergency by emitting audible signals. In some embodiments, sound notification module 332 emits signals ranging from approximately 500 Hz (low frequency) to approximately 3 kHz (high frequency). Fire notification device 330 can be connected to notification sensor 338. Notification sensor 338 can be any type of sensor that is communicably coupled to both fire notification device 330 and network 446. In some embodiments, notification sensor 338 is coupled directly to fire notification device 330 and draws power from the power source of fire notification device 330. For example, notification sensor 338 can be powered by the IDNAC power and communications output by a control panel that is powering fire notification device 330. Notification sensor 338 can then output environmental data (e.g., temperature, humidity, etc.) to network 446.

Fire detection system 300 is further shown to include mesh cloud 350. Mesh cloud 350 may function as any type of mesh network in which one or more nodes of the network route data to a location for analysis. In some embodiments, node sensors 352, 354, 356, 358 wirelessly route data to network 446. Node sensor 360 is shown to include a power source 362, a processing circuit 364, and a communications interface 369. Power source 362 may include a battery attached to node sensor 360, an external AC power source wired to node sensor 360, or a combination of both. In some embodiments, node sensor 360 may act as any active electronic device in a wireless mesh network that aids in moving and/or producing data. For example, node sensor 360 communicates with node sensor 356 and routes data to BMS controller 336 through network 446. In other embodiments, other nodes in mesh cloud 350 may be directly connected to sprinklers in fire detection system 300. In other embodiments, node sensors in mesh cloud 350 may be directly integrated into components of sprinklers in building 10.

Communications interface 369 may include wired or wireless communications interfaces (e.g., jacks, antennas, transmitters, receivers, transceivers, wire terminals, etc.) for conducting data communications with building subsystems 428 or other external systems or devices. In various embodiments, communications via interface 369 can be direct (e.g., local wired or wireless communications) or via a communications network 446 (e.g., a WAN, the Internet, a cellular network, etc.). For example, interface 369 can include an Ethernet card and port for sending and receiving data via an Ethernet-based communications link or network. In another example, interface 728 can include a Wi-Fi transceiver for communicating via a wireless communications network. In another example, communications interface 369 can include cellular or mobile phone communications transceivers. In various embodiments, communications interface 369 can be a power line communications interface or an Ethernet interface.

Processing circuit 364 is shown to include a processor 368 and memory 366. Processor 368 can be implemented as a general purpose processor, an application specific integrated circuit (ASIC), one or more field programmable gate arrays (FPGAs), a group of processing components, or other suitable electronic processing components. Memory 366 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 366 can be or include volatile memory or non-volatile memory. Memory 366 can include database components, object code components, script components, or any other type of information structure for supporting the various activities and information structures described in the present application. According to an example embodiment, memory 366 is communicably connected to processor 368 via processing circuit 364 and includes computer code for executing (e.g., by processing circuit 364 and/or processor 368) one or more processes described herein.

Fire detection system 300 is further shown to include sprinkler head 320, fire detection sensor 322 and main water line 106 that may be used as part of fire detection system 300. For example, main water line 106 is supplying water to sprinkler head 320. Fire detection sensor 322 is directly coupled to sprinkler head 320 and will initiate corrective action from sprinkler head 320 (i.e., release water from sprinkler head) if abnormal signal data is being received that would indicate a fire (e.g., high temperate data, smoke detection data, etc.). In other embodiments, fire detection sensor 322 may send data to BMS controller 336 through network 446 to be analyzed and, if BMS controller 336 detects abnormal signal data that would indicate a fire, transmit a signal to sprinkler head 320 to initiate corrective action. This embodiment may be performed so as to collect all fire detection data in a central controller.

Fire detection system 300 is shown to include network 446. Network 446 can be any communications network that allows the nodes in network 446 to share information. Nodes in network 446 (e.g., computers, phones, servers, sensors, transponders, etc.) may connect via wired connection or wireless connection. Network 446 may also be connected to several more fire detection and fire suppression components (e.g., sprinkler systems, emergency response systems, HVAC systems, etc.) that aid in the detection and suppression of fires. In fire detection system 300, this information may include temperature data, smoke detection signals, humidity data, or any other type of information relating to the detection and suppression of fires. In system 500 (shown in FIG. 5), Fire Alarm Control Panel (FACP) 510 and improved notification device 530 may be connected through access point 520 to transmit fire detection data to network 446.

Figure 4:
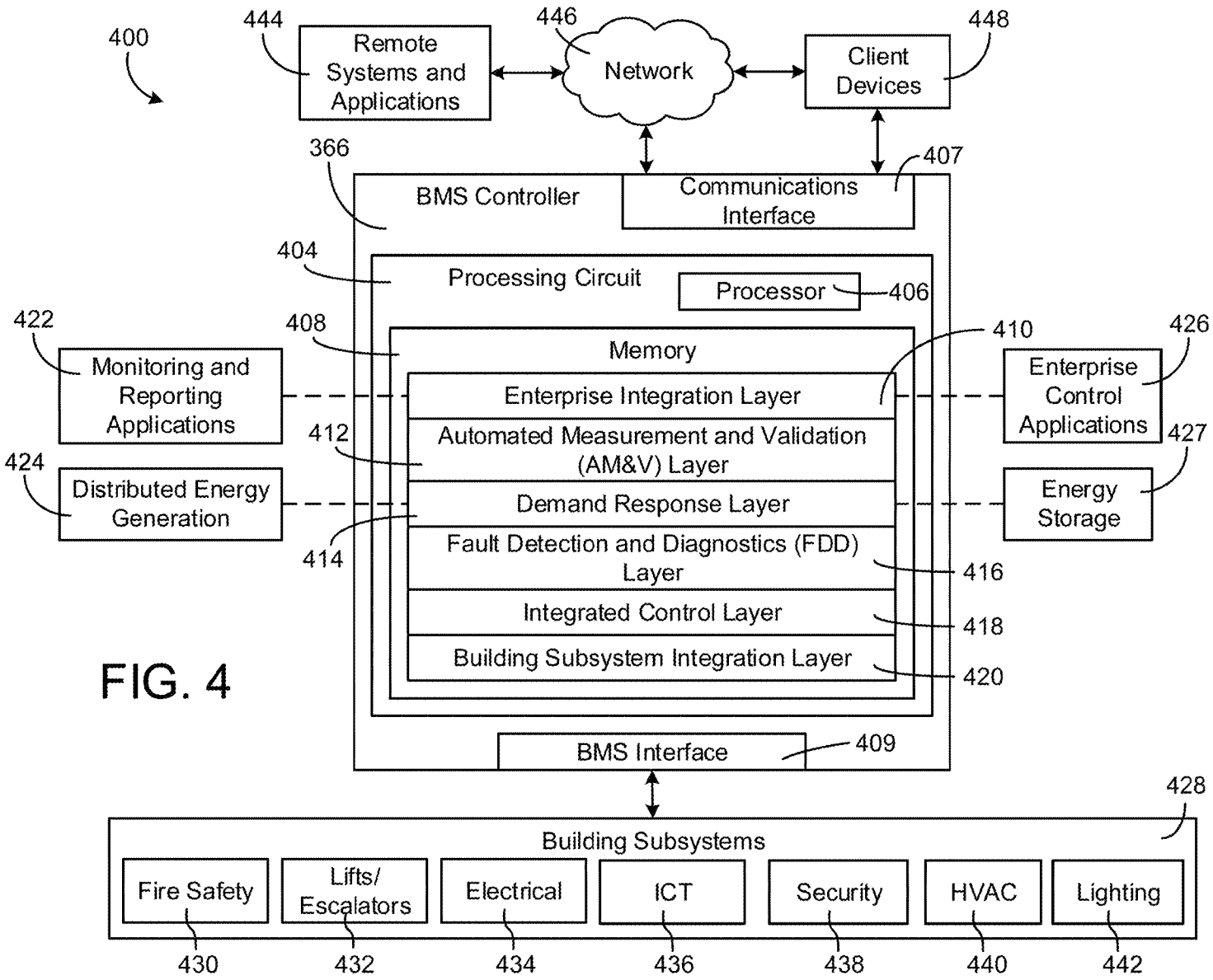
FIG. 4 is a block diagram of a BMS which can be used in the building of FIG. 1, according to some embodiments.

BMS controller 336 can act as any type of controlling unit that collects data from detection system 300 and is described in greater detail in FIG. 4. BMS controller 366 is shown to include a communications interface 376 and processing circuit 370.

Communications interface 376 may include wired or wireless communications interfaces (e.g., jacks, antennas, transmitters, receivers, transceivers, wire terminals, etc.) for conducting data communications with building subsystems 428 or other external systems or devices. In various embodiments, communications via interface 376 can be direct (e.g., local wired or wireless communications) or via a communications network 446 (e.g., a WAN, the Internet, a cellular network, etc.). For example, interface 376 can include an Ethernet card and port for sending and receiving data via an Ethernet-based communications link or network. In another example, interface 376 can include a Wi-Fi transceiver for communicating via a wireless communications network. In another example, communications interface 376 can include cellular or mobile phone communications transceivers. In various embodiments, communications interface 376 can be a power line communications interface or an Ethernet interface.

Processing circuit 370 is shown to include a processor 372 and memory 374. Processor 372 can be implemented as a general purpose processor, an application specific integrated circuit (ASIC), one or more field programmable gate arrays (FPGAs), a group of processing components, or other suitable electronic processing components. Memory 374 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 374 can be or include volatile memory or non-volatile memory. Memory 374 can include database components, object code components, script components, or any other type of information structure for supporting the various activities and information structures described in the present application. According to an example embodiment, memory 374 is communicably connected to processor 372 via processing circuit 370 and includes computer code for executing (e.g., by processing circuit 370 and/or processor 372) one or more processes described herein.

Display device 380 can be any type of video or audio system that displays information about fire detection system 300 to a user and can be communicably connected to communications interface 376 of BMS controller 336. In some embodiments, display device 380 can act as a computer with fire detection information (charts, data, etc.) outputted onto a user interface. In other embodiments, display device may act signal that is transmitted to building occupants in the case of an emergency.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Fire Detection System

Figure 5:
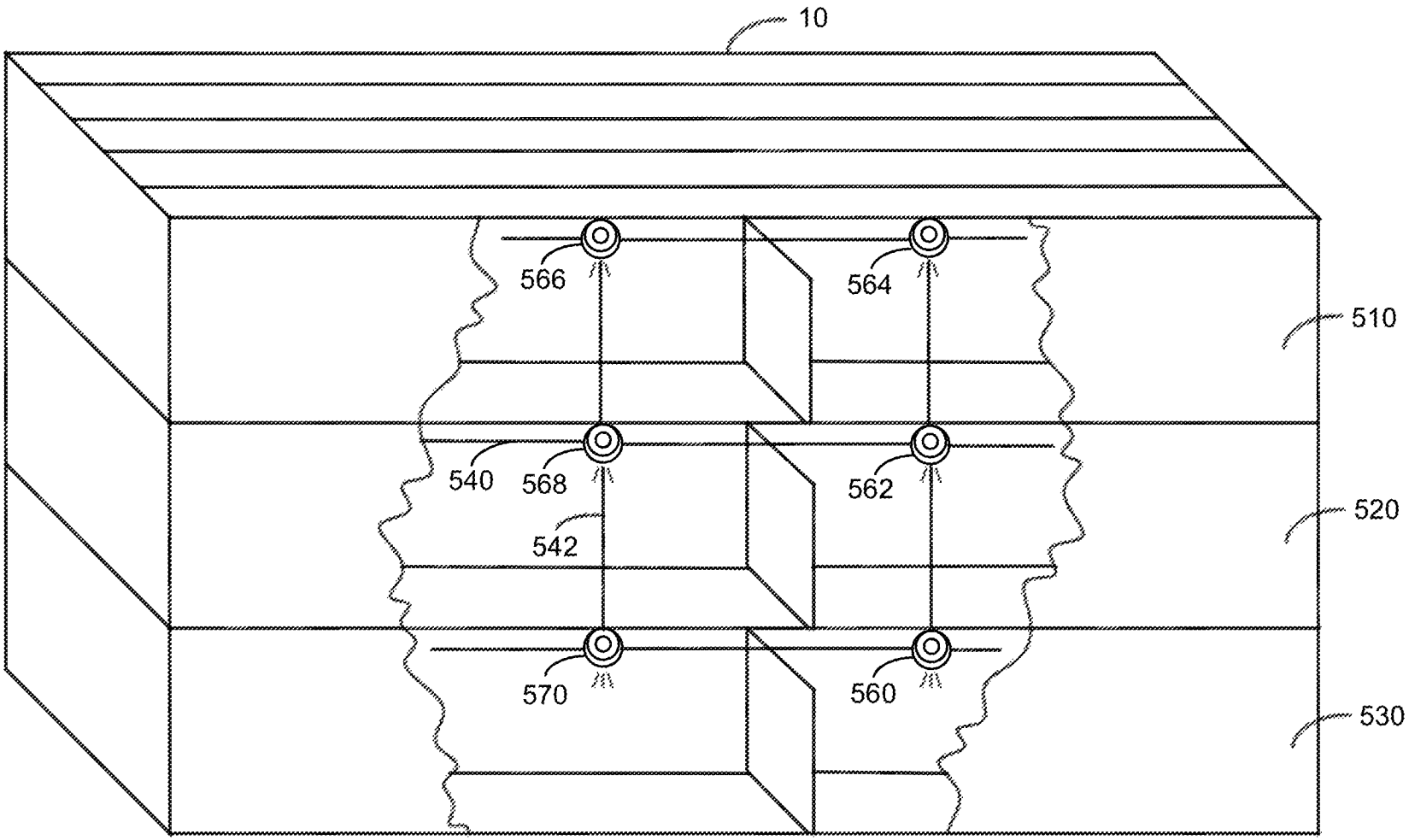
FIG. 5 is a drawing of the building of FIG. 1 equipped with a wireless mesh network, according to some embodiments.
Figure 6:
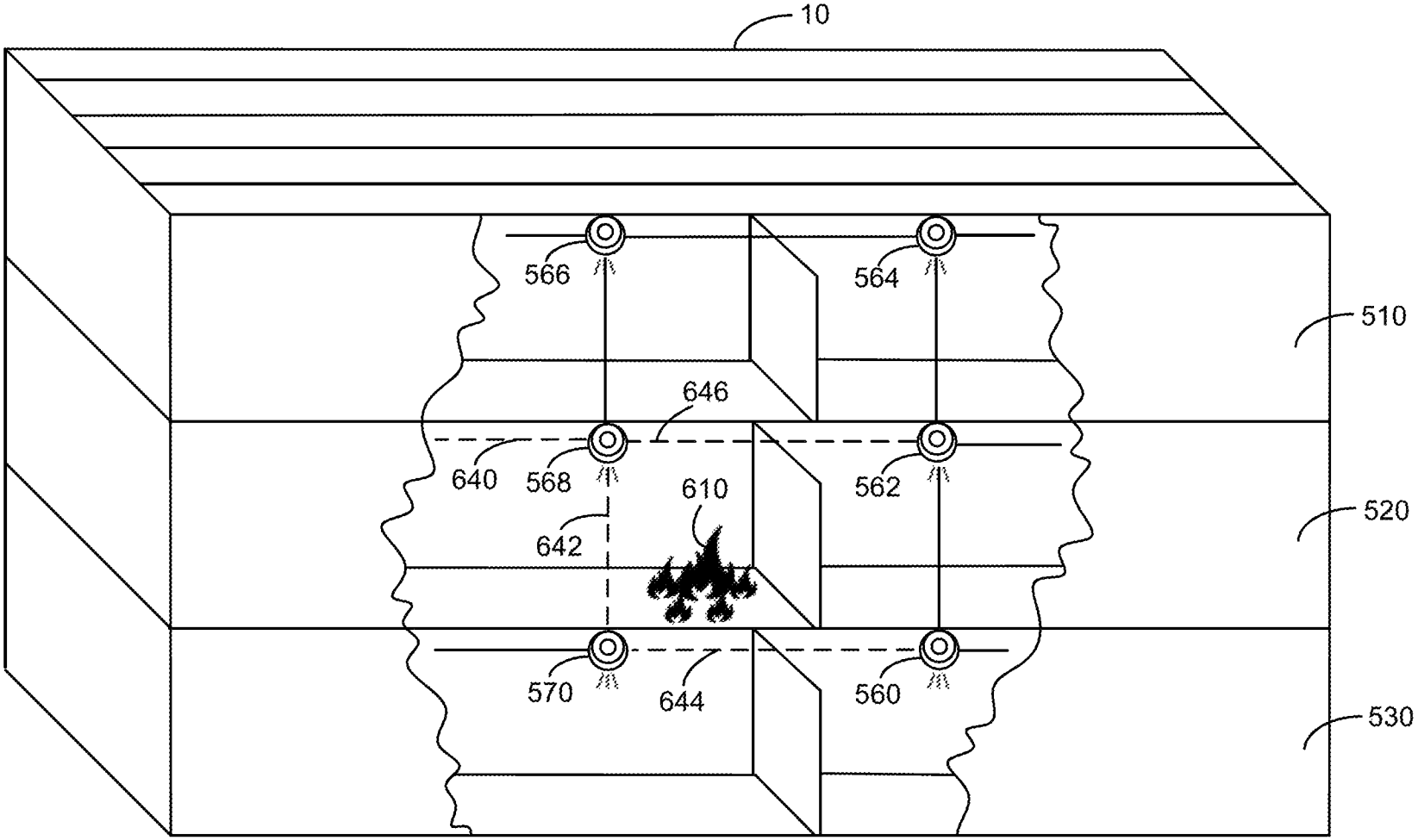
FIG. 6 is a drawing of the building of FIG. 1 equipped with a wireless mesh network responding to a fire, according to some embodiments.

Turning now to FIGS. 5-6, drawings of a wireless mesh network responding to a fire are shown, according to various embodiments. Building 10 includes a plurality of wireless mesh nodes 720. 730, 740, 750, 760. Building 10 may include one or more wireless mesh nodes that may or may not be configured to transmit and receive data. For example, wireless mesh node 760 may be wireless connected to both wireless mesh nodes 750 and 720 through transponders configured to transmit and receive radio signals. Due to current wireless technology allowing wireless communication between building floors, wireless mesh nodes 750 and 730 on floor 520 may be wirelessly connected to wireless mesh nodes 760 and 720 on floor 530.

Referring now to FIG. 5, a drawing of a wireless mesh network operating in normal environmental conditions is shown. In some embodiments, normal environmental conditions can be shown to mean any conditions that do not include significantly high temperatures that would indicate nearby combustion. In some embodiments, wireless mesh network 700 is implemented inside of building 10. The plurality of wireless mesh nodes 720, 730, 740, 750, 760 may be wireless connected to transmit radio signals. For example, wireless mesh node 760 may transmit radio signal 542 to wireless mesh node 750. Building 10 may include multiple wireless mesh nodes on multiple floors on a larger scale than what is outlined in FIG. 5. This is shown by wireless mesh node 750 transmitting a signal 540 to another part of building 10. Because building 10 is shown to be operating in normal environmental conditions, the transmitted radio signals exemplified by signals 540, 542 are considered to be stable and normal signals that may be used as a baseline reading.

Referring now to FIG. 6 a drawing of a wireless mesh network operating in abnormal environmental conditions is shown. Abnormal environmental conditions can be shown to mean any conditions that include significantly high temperatures that would indicate nearby combustion. In some embodiments, increased radio energy absorbed by water molecules occurs due to a fire 610. This may affect the signal strength of transmitted signals between the wireless mesh nodes. For example, fire 610 may induce signal degradation in signal 640, 642, 644 and signal 646 from wireless mesh node 568. As distance from fire 610 increases, the quantity of water molecules excited to absorb radio energy may decrease. This can result in a negative correlation between the distance from fire 610 and signal degradation resulting from combustion, allowing a method for pinpointing the specific location of a fire in building 10.

In other embodiments, radio energy can be absorbed by fire 610 itself. Fire, a chemical reaction between fuel and an oxidizer that induces combustion, includes a portion of its molecules that are ionized. When radio energy travels through the medium of a fire, energy is absorbed by the charged particles of the ionized molecules. This may affect the signal strength of transmitted signals between the wireless mesh nodes in wireless mesh network 700. For example, fire 610 may induce signal distortion in signal 640, 642, 644 and signal 646 from wireless mesh node 568. As distance from fire 610 increases, the amount of radio energy absorbed by the charged particles may decrease. This can result in a negative correlation between the distance from fire 610 and signal distortion resulting from combustion, allowing a method for pinpointing the specific location of a fire in building 10.

In other embodiments, radio energy can be absorbed by smoke due to fire 610. Smoke can include any combination of particles that did not burn during the process of combustion (e.g., water, carbon, hydrocarbons, magnesium, etc.). Although the chemical composition of smoke will depend on the composition of the burning fuel, it will typically absorb less radio energy compared to the energy absorbed by water molecules, due to the fact that water vapor is only a singular component included in smoke. However, if the resulting smoke from fire 610 is dense enough, significant radio energy can be absorbed by the water molecules in the resulting smoke. This may affect the signal strength of transmitted signals between the wireless mesh nodes. For example, fire 610 may induce signal distortion in signal 640, 642, 644 and signal 646 from wireless mesh node 568. As distance from fire 610 increases, the quantity of water molecules excited to absorb radio energy may decrease. This can result in a negative correlation between the distance from fire 610 and signal distortion resulting from combustion, allowing a method for pinpointing the specific location of a fire in building 10.

In some embodiments, the component of the combustion process responsible absorbing radio energy in wireless mesh network 700 may be the following: water molecules produced by the burning of certain fuels that include water (e.g., wood), charged particles inside of ionized molecules in flames, smoke that includes molecules that can absorb radio energy (e.g., water molecules), or any combination thereof.

Figure 7:
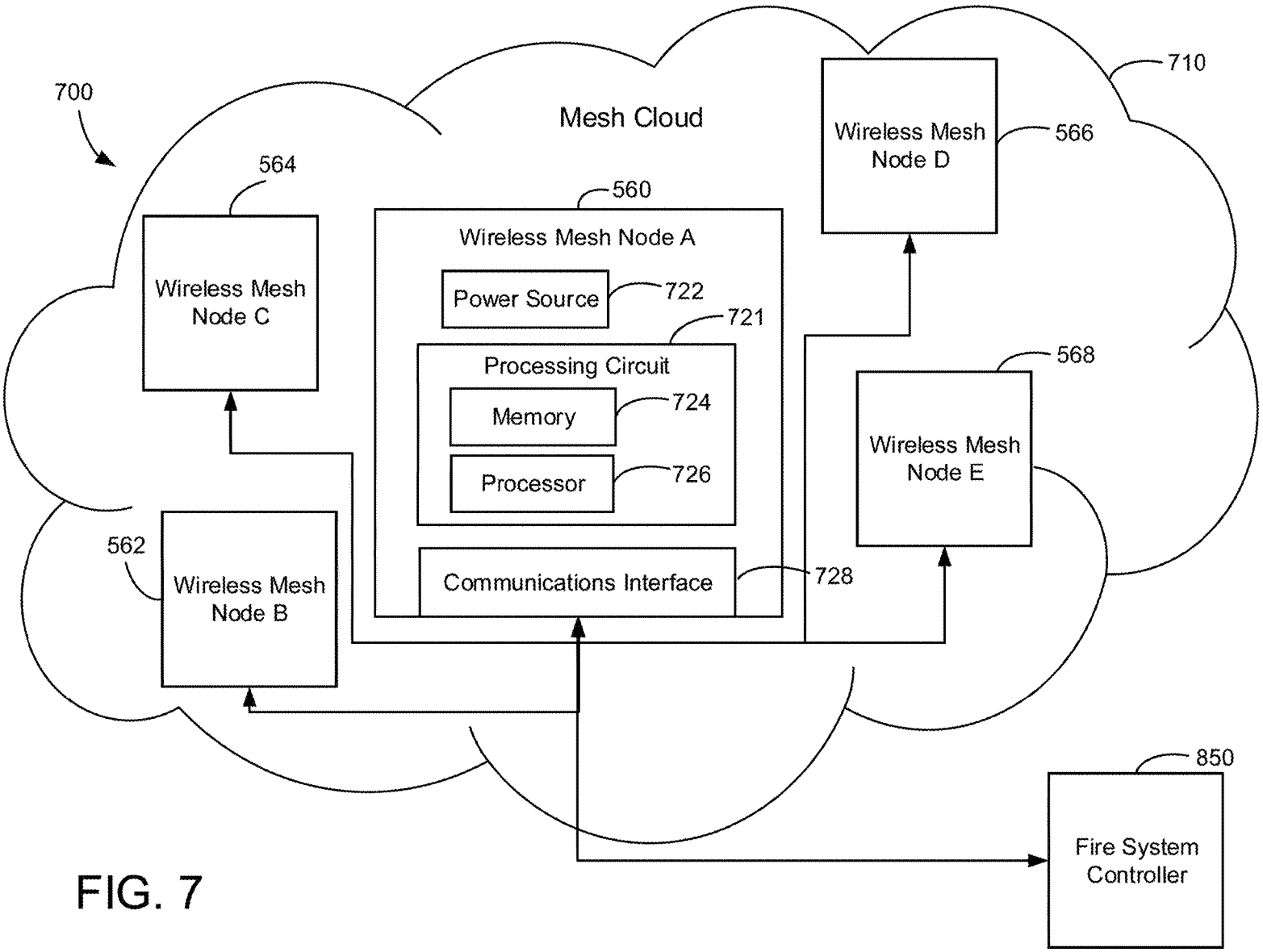
FIG. 7 is a block diagram of a wireless mesh network which can be used as part of the fire safety system of FIG. 5, according to some embodiments.

Turning now to FIGS. 7-8 systems for building fire detection and suppression are shown, according to some embodiments. FIG. 7 outlines a wireless mesh network 700 and a plurality of wireless mesh nodes therein, configured to transmit and receive signals between the different wireless mesh nodes. Information regarding these signals are collected in fire system controller 850 for analysis regarding building fire detection. Once a fire is detected, a signal is sent to BMS controller 366 to engage in corrective action for building fire suppression.

Referring now to FIG. 7, wireless mesh network 700 is shown, according to an exemplary embodiment. Wireless mesh network 700 may act as a collection of wireless mesh nodes configured to monitor signals in mesh cloud 710. Mesh cloud 710 may contain a plurality of wireless mesh nodes, such as wireless mesh nodes 720, 730, 740, 750, and 760. Wireless mesh nodes in mesh cloud 710 may be configured to monitor the signal characteristics of the signals transmitted and received by the plurality of wireless mesh nodes. Signal characteristics may include but are not limited to link quality, signal strength, bit rate and other signal characteristics. Link quality characteristics focus primarily on the quality of the signal, such as bit error ratio, where the number of bit errors occurring over a specified period of time is monitored. Signal strength may represent the power of the signal received from one mesh node to another mesh node, measured at the location of the mesh node that receives the signal. Bit rate may represent the number of bits per second that can be transmitted across a digital network.

Wireless mesh cloud 710 can be shown to include a plurality of wireless mesh nodes including wireless mesh nodes 720, 730, 740, 750, and 760. In some embodiments, wireless mesh cloud 710 may only refer to the collection of wireless mesh nodes and not an entire wireless network. For example, mesh cloud 710 includes wireless mesh nodes 720, 730, 740, 750, and 760 and wireless mesh network 700 includes mesh cloud 710 and fire system controller 850.

Wireless mesh node 720 is shown to include a power source 722, a processing circuit 721, and a communications interface 728. Power source 722 may include a battery attached to wireless mesh node 720, an external AC power source wired to wireless mesh node 720, or a combination of both. In some embodiments, wireless mesh node 720 may act as any active electronic device in wireless mesh network 700 that aids in moving and/or producing data. For example, wireless mesh node 720 communicates with wireless mesh node 730 and routes data to fire system controller 850. In other embodiments, wireless mesh nodes in mesh cloud 710 may be directly connected to sprinklers in sprinkler system 860. In other embodiments, wireless mesh nodes in mesh cloud 710 may be integrated into components of sprinkler system 860 or into components of emergency response system 870. For example, wireless mesh node 560 can be directly connected to a fire alarm in emergency response system 870 such that both components are powered by power source 722.

Communications interface 728 may include wired or wireless communications interfaces (e.g., jacks, antennas, transmitters, receivers, transceivers, wire terminals, etc.) for conducting data communications with building subsystems 428 or other external systems or devices. In various embodiments, communications via interface 728 can be direct (e.g., local wired or wireless communications) or via a communications network 446 (e.g., a WAN, the Internet, a cellular network, etc.). For example, interface 728 can include an Ethernet card and port for sending and receiving data via an Ethernet-based communications link or network. In another example, interface 728 can include a Wi-Fi transceiver for communicating via a wireless communications network. In another example, communications interface 728 can include cellular or mobile phone communications transceivers. In one embodiment, communications interface 728 is a power line communications interface and BMS interface 409 is an Ethernet interface. In other embodiments, both communications interface 728 and BMS interface 409 are Ethernet interfaces or are the same Ethernet interface.

Processing circuit 721 is shown to include a processor 726 and memory 724. Processor 726 can be implemented as a general purpose processor, an application specific integrated circuit (ASIC), one or more field programmable gate arrays (FPGAs), a group of processing components, or other suitable electronic processing components. Memory 724 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 724 can include database components, object code components, script components, or any other type of information structure for supporting the various activities and information structures described in the present application. According to an example embodiment, memory 724 is communicably connected to processor 726 via processing circuit 721 and includes computer code for executing (e.g., by processing circuit 721 and/or processor 726) one or more processes described herein.

Processing circuit 721 may include an embedded routing algorithm that communicably connects to communications interface 728 to dynamically route data to and from the different mesh nodes within mesh cloud 710. In some embodiments, one or more wireless mesh node may be connected to a server. For example, wireless mesh node 720 is directly connected to fire system controller 550 through communications interface 728, while wireless mesh nodes 730, 740, 750, and 760 are wireless connected to each other in wireless mesh network 700.

Still referring to FIG. 7, wireless mesh network 700 is connected to fire system controller 850. In some embodiments fire system controller may include a memory component that includes one or more functional modules that configure fire system controller 850 to operate as a server for a wireless mesh network 700. In some wireless mesh networks, only one mesh node is connected to a sever. For example, fire system controller 850 be directly connected to only wireless mesh node 720, but is communicably connected to and actively storing data from entire mesh cloud 710.

Referring now to FIG. 8, a block diagram of a fire safety system 430 is shown, according to an exemplary embodiment. Fire safety system 430 is shown to include a fire system controller 850 which can communicate with BMS controller 366, sprinkler system 860, emergency response system 870, various other components of BMS 400, and/or external systems or devices. Fire system controller 850 may act as a controller that focuses primarily on monitoring fire safety system 430. In some embodiments, the actions of fire system controller 850 are performed by BMS controller 366. In other embodiments, fire system controller 850 is connected to network 446, directly connected to BMS controller 366 or a combination of both. For example, fire system controller 850 inputs data from wireless mesh network 700 and analyzes the data for abnormal signal characteristics. When a decrease in signal strength is observed, fire system controller 850 may send a signal to BMS controller 366 for fire suppression. BMS controller 366 may then engage sprinkler system 860 and/or contact emergency responders through emergency response system 870.

Fire system controller 850 is shown to include a communications interface 830 and a processing circuit 810. Communications interface 830 can be or include wired or wireless communications interfaces (e.g., jacks, antennas, transmitters, receivers, transceivers, wire terminals, etc.) for conducting data communications with BMS controller 366, network 446 sprinkler system 860, emergency response system 870, or other external systems or devices. In various embodiments, communications via interface 830 can be direct (e.g., local wired or wireless communications) or via a communications network 446 (e.g., a WAN, the Internet, a cellular network, etc.). For example, communications interface 830 can include an Ethernet card and port for sending and receiving data via an Ethernet-based communications link or network. In another example, communications interface 830 can include a Wi-Fi transceiver for communicating via a wireless communications network. In another example, communications interface 830 can include cellular or mobile phone communications transceivers. In one embodiment, communications interface 830 is a power line communications interface or an Ethernet interface.

Processing circuit 810 is shown to include a processor 812 and a memory 820.

Processing circuit 812 can be communicably connected to communications interface 830 such that processing circuit 810 and various components thereof can send and receive data via communications interface 830. Processor 812 can be implemented as a general purpose processor, an application specific integrated circuit (ASIC), one or more field programmable gate arrays (FPGAs), a group of processing components, or other suitable electronic processing components.

Memory 820 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 820 can be or include volatile memory or non-volatile memory. Memory 820 can include database components, object code components, script components, or any other type of information structure for supporting the various activities and information structures described in the present application. In some embodiments, memory 820 is communicably connected to processor 812 via processing circuit 810 and includes computer code for executing one or more processes described herein.

Still referring to FIG. 8, memory 820 is shown to include a signal data collector 822, a signal data monitor 824, a routing protocol handler 826, and a fire location finder 828. Signal data collector 822 can be configured to collect information on the plurality of signal characteristics from the mesh network signals. In some embodiments, signal data collector 822 may store data that indicates the link quality of the signal, signal strength, bit rate, and other signal characteristics. Link quality may be an overall representation of a signal that takes multiple characteristics into account. This may include monitoring the bit error ratio, where the number of bit errors occurring over a specified period of time is monitored. Signal strength may represent the power of the signal transmitted from one mesh node to another mesh node, measured at the location of the mesh node that receives the signal. In some embodiments, signal data collector 522 can be configured to monitor and detect changes in signal strength reported by the mesh nodes. Bit rate may represent the number of bits per second that can be transmitted across a digital network.

Signal data monitor 824 can be any component that is monitoring signal characteristics inside of fire system controller 850. For example, signal data monitor can monitor data that indicates link quality of the signal, signal strength, bit rate, and other signal characteristics.

Routing protocol handler 826 may be configured to manage the routed data coming into fire system controller 850 by use of a routing table. For example, as wireless mesh nodes 720, 730, 740, 750, and 760 are communicating, packets of data may be sent to and from the different nodes in mesh cloud 710. These packets of data can be routed to fire system controller 850 for analysis, but the packets of data from the nodes may show up at different intervals. It is therefore useful that fire system controller 850 be configured to read the address of the incoming data packet and process it accordingly.

In some embodiments, fire location finder 828 can be any component that utilizes both building schematics and abnormal signal data from wireless mesh network 700 to pinpoint a specific location of a fire. Fire suppression controller 829 can be the means of a building controller responsible for engaging in fire suppression, up to and including engaging sprinkler system 860 and emergency response system 870. In some embodiments, this task is performed by BMS controller 366. In other embodiments, fire system controller may be responsible for some or all of the building fire detection and suppression.

In some embodiments, fire system controller 830 may input and analyze some or all of the raw data coming in from the mesh network to detect a fire. Once a fire is detected, fire system controller 830 may then send information to BMS controller 366 for further fire suppression. In other embodiments, fire system controller 830 may be a component of BMS controller 366 and BMS controller 366 handles some or all of the raw data coming in from the mesh network. As shown in FIG. 8, fire system controller 850 is a separate component from that of BMS controller 366 and is responsible for the systems and methods of fire detection in building 10.

Still referring to FIG. 8, fire safety system 430 can be integrated with BMS 400 and, by extension, sprinkler system 860 and emergency response system 870 through network 446. Sprinkler system 860 can any fire protection/suppression method consisting of a water supply system. In some embodiments, sprinkler system 860 may include a plurality of sprinkler heads located in one or more rooms on one or more floors, linked together by an internal piping system for the water supply. In some embodiments, engaging sprinkler system 860 can be used in conjunction with monitoring wireless mesh network 700 to detect activated sprinklers. For example, when fire 610 is detected in building 10, sprinkler system 860 will be engaged for fire suppression. Engaging sprinkler system 860 will incur a significant amount of water into the area of combustion that, when exposed to the significant heat generated by fire 610, may result in rapidly increased amounts of water vapor. Detection of which sprinkler heads are activated in sprinkler system 860 may be performed based on monitoring the changing amounts of radio energy absorbed due to the increased amounts of water vapor in the area. Detection may also be performed based on separate sensors utilized for monitoring water vapor levels in the air. Emergency response system 870 can be any means for notifying and/or engaging first responders to an emergency. This system can also include notifying the building occupants of an emergency (e.g. fire alarm, PA speaker message, strobe light, etc.).

Fire Detection Processes

Figure 9:
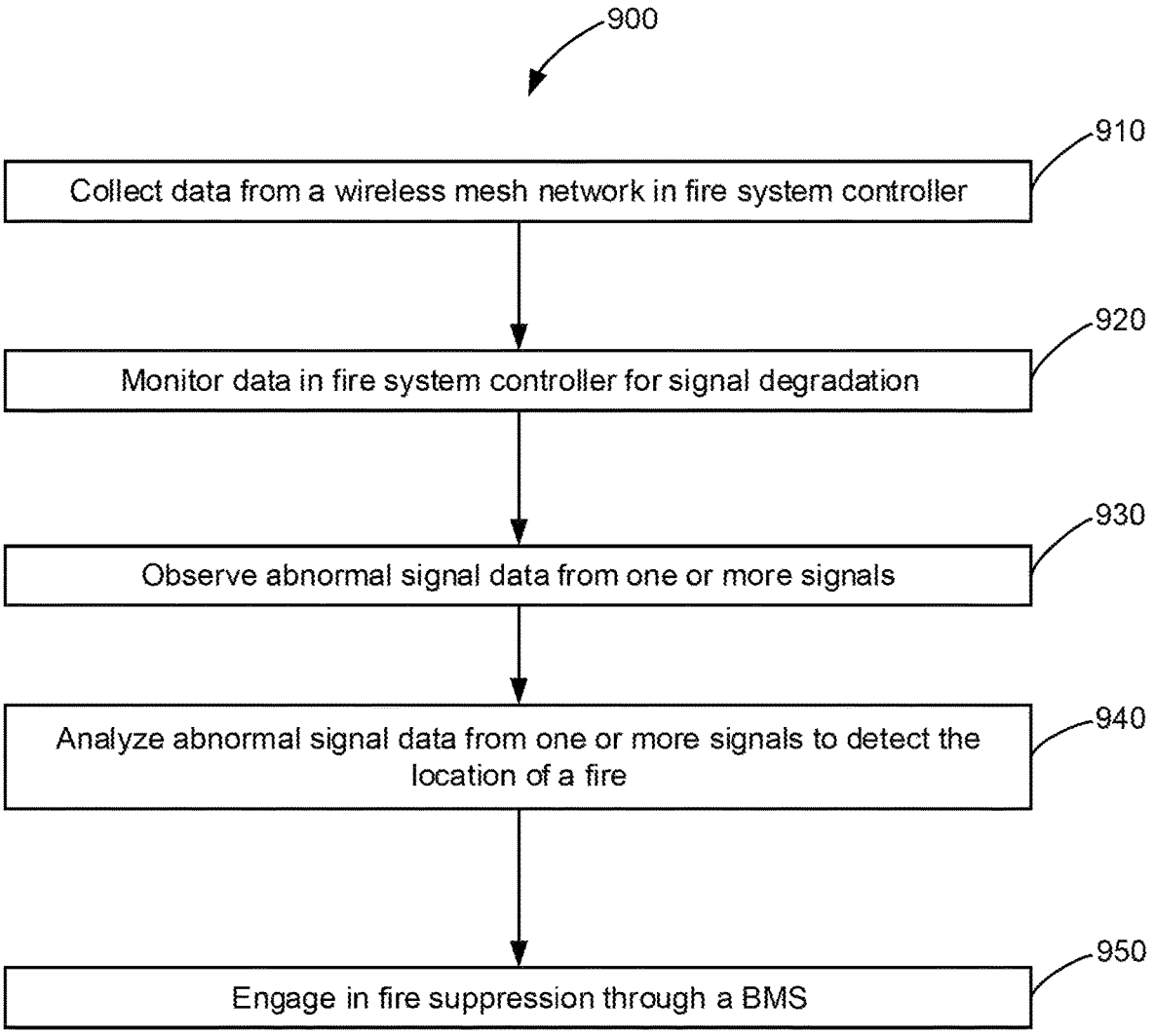

Referring now to FIG. 9, a process 900 for detecting and suppressing fires based on analysis of abnormal radio frequency signals is shown, according to an exemplary embodiment. Process 900 can be performed by fire system controller 850 and/or other components of fire safety system 830, as outlined in FIG. 8.

Process 900 is shown to include collecting data from a wireless mesh network (step 910). In some embodiments, all wireless mesh nodes in wireless mesh network 700 route data to and from other wireless mesh nodes on the network using a routing algorithm. This data may be information regarding the signals in wireless mesh network 700. In some embodiments, this may include the link quality of the signal, signal strength, bit rate, and other signal characteristics. Link quality may be an overall representation of a signal takes multiple characteristics into account. This may include monitoring the bit error ratio, where the number of bit errors occurring over a specified period of time is monitored. Signal strength may represent the power of the signal transmitted from one mesh node to another mesh node, measured at the location of the mesh node that receives the signal. Bit rate may represent the number of bits per second that can be transmitted across a digital network. Only one wireless mesh node may be directly connected to fire system controller 850 in some embodiments. For example, fire system controller 850 may act as a server connected to a singular wireless mesh node 720. In other embodiments, two or more of wireless mesh nodes 720-760 may be directly connected to fire system controller 850.

Process 900 is shown to include monitoring data in a controller for abnormal signal characteristics (step 910). Step 910 can be performed by controller 850 in wireless mesh network 700, where it can be configured to input signal data from the mesh network and analyze it for abnormal signal characteristics. Signal characteristics can be brought in to fire system controller 850 as packets of data from the mesh network. Due to potential network traffic, routing protocol handler 826 can re-organize any incoming data packets that are out-of-order and store the data in signal data collector 822. Signal data monitor 824, which can be any component that is monitoring signal characteristics inside of fire system controller 850, may monitor the stored data for abnormal characteristics based on link quality of the signal, signal strength, bit rate, and other signal characteristics. When abnormal signal characteristics are observed by fire system controller 850 and a fire has been detected, fire location finder 828 uses information on building schematics and the location of the wireless mesh nodes to pinpoint the location of the fire. Fire location finder 828 can be any component that utilizes both building schematics and abnormal signal data from wireless mesh network 700 to pinpoint a specific location of a fire.

Process 900 is shown to include observing abnormal signal data from one or more signals (step 930). Due to the phenomenon of radio energy being absorbed by water molecules at a given frequency, signal data that details degradation in the quality, signal strength, bit rate, and other characteristics indicate a potential fire at the location at or near those degraded signals. Fire location finder 828 is able to pinpoint where this potential fire may be, based on the 3-dimensional structure of wireless mesh nodes and the proximity of the potentially abnormal signals.

Process 900 is shown to include analyzing abnormal signal data from one or more signals to detect the location of a fire (step 940). For example, signal data monitor 824 monitors signal characteristics inside of fire system controller 850. When abnormal signal characteristics are detected, fire location finder 828 utilizes both building schematics and abnormal signal data from wireless mesh network 700 to pinpoint a specific location of a fire.

Process 900 is shown to include engaging in fire suppression through a BMS (step 950). In some embodiments, sprinkler system 860 and emergency response system 870 can be engaged by BMS controller 366. Engaging fire suppression can include any means taken as corrective action for suppressing a fire. Corrective action may be performed in BMS controller 366 or a separate controller responsible for fire safety, such as fire system controller 850.

Referring now to FIG. 10 a process 1000 for detecting a building fire location by analyzing abnormal radio frequency signals due to combustion is shown, according to an exemplary embodiment. In some embodiments, process 1000 is performed by one or more components of wireless mesh network 700, as outlined in FIG. 7.

Process 1000 is shown to include establishing a wireless mesh network comprising a plurality of wireless mesh nodes distributed throughout the building, each of the wireless mesh nodes configured to transmit and receive wireless signals (step 1010). The wireless mesh nodes may transmit and receive radio signals through transponders, allowing them to both transmit and receive radio signals. This provides ability for data to be routed and sent to a server for further analysis. For example, step 1010 may include establishing a wireless mesh network 700 that includes a network of wireless communication devices, such as mesh cloud 710, wireless mesh nodes 720-760, and fire system controller 850.

Process 1000 is shown to include operating the wireless mesh nodes to transmit and receive the wireless signals during a baseline time period and recording a baseline set of signal characteristics that characterize the wireless signals during the baseline time period (step 1020). In some embodiments, this step may be performed by all of the wireless mesh nodes in wireless mesh cloud 710. To monitor abnormal signal characteristics due to radio energy being absorbed by fire, a frequency must be used that excited the water molecules to a level capable of absorbing significant radio energy. For example, this first frequency could be configured to operate at the IEEE 802.11 wireless communication specifications, allowing the network to operate at 2.4 to 2.5 GHz. At this frequency, water molecules experience vibrations that allow them to absorb radio energy. One of the byproducts of combustion is water vapor, created by the burning of building materials (e.g., wood). As an increase in water vapor occurs, a great amount of radio energy will be absorbed, if the signal is at such a frequency that allows it to absorb radio energy. Therefore, operating the network at a 2.4 to 2.5 GHz frequency band will yield a positive correlation between combustion and absorbed radio energy. Signal characteristics as defined above, may include but are not limited to: signal strength, link quality, bit rate, and bit error ratio. All wireless mesh nodes may be configured to communicate using this frequency.

Process 1000 is shown to include operating the wireless mesh nodes to transmit and receive the wireless signals during a second time period after the baseline time period and recording a second set of signal characteristics that characterize the wireless signals during the second time period (step 1030). In some embodiments, this step may be performed by all of the wireless mesh nodes in wireless mesh cloud 710. To monitor abnormal signal characteristics due to radio energy being absorbed by fire, a frequency must be used that excited the water molecules to a level capable of absorbing significant radio energy. In some embodiments, the frequency can be in the range of 2.4 to 2.5 GHz.

Process 1000 is shown to include determining that the second set of signal characteristics are abnormal relative to the baseline set of signal characteristics, resulting from a fire within the building degrading the wireless signals during the second time period (step 1040). In some embodiments, abnormal signal characteristics can be determined by signal data monitor 824 in fire system controller 850.

Process 1000 is shown to include detecting the fire within the building in response to a determination that the second set of signal characteristics are abnormal relative to the baseline set of signal characteristics (step 1050). In some embodiments, detecting the fire within the building can be determined by fire 824 in fire location finder 828. BMS controller may then receive the location of the fire and initiative corrective action for fire suppression. In other embodiments, the fire system controller can both analyze the signal data for fire detection and initiate corrective action for fire suppression. For example, fire location finder 828 detects the location of a fire and fire suppression controller 829 engages sprinkler system 860 for fire suppression.

Process 1000 is shown to include initiating corrective action in response to detecting the fire within the building (step 1060). In step 1060 of process 1000, corrective action is initiated through a device in the BMS in response to detecting a fire. For example, BMS 400 contains BMS controller 366 which may act as the device controlling the corrective action. A corrective action may be configured to be a sprinkler system engaging for fire suppression or a notification to emergency services. These corrective actions may be location sensitive. For example, if a fire is detected by fire location finder 828 and a signal is sent to BMS controller 366 to engage in fire suppression, BMS controller may engage sprinkler system 860. This system may only turn on the sprinklers in the location where abnormal signals were recorded.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for detecting an event in or around a building, the method comprising:

recording a baseline signal characteristic that characterizes a wireless radio signal transmitted between transceivers of devices in or around the building during a baseline time period;

recording a second signal characteristic that characterizes the wireless radio signal during a second time period after the baseline time period;

detecting an event comprising at least one of a fire within the building or an increased level of water vapor within the building in response to a determination that the second signal characteristic is abnormal relative to the baseline signal characteristic; and triggering an alarm in response to detecting the event.

2. The method of claim 1, wherein the wireless signal is within a frequency range compliant with IEEE 802.11 Wi-Fi communications specifications or IEEE 802.15.4-based specifications.

3. The method of claim 1, wherein detecting the event comprises:

identifying a building location located between a first device from which the wireless signal is transmitted and a second device at which the wireless signal is received;

determining that the event is occurring within the building location.

4. The method of claim 1, wherein the second signal characteristic is determined to be abnormal relative to the baseline signal characteristic if the second signal characteristic comprises at least one of a degradation in signal strength, a degradation in link quality, or a degradation in bit rate relative to the baseline signal characteristic.

5. The method of claim 1, further comprising:

observing the baseline signal characteristic and the second signal characteristic at a plurality of locations throughout the building; and transmitting the baseline signal characteristic and the second signal characteristic observed at the plurality of locations to a controller.

6. The method of claim 5, wherein the controller comprises at least one of a building management system (BMS) controller or a fire system controller.

7. A system for detecting an event within a building, the system comprising:

a wireless network comprising a plurality of wireless devices distributed throughout the building and configured to:

record a baseline signal characteristic that characterizes a wireless radio signal transmitted between transceivers of the plurality of wireless devices during a baseline time period;

record a second signal characteristic that characterizes the wireless radio signal during a second time period after the baseline time period;

a controller configured to:

detect an event comprising at least one of a fire within the building or an increased level of water vapor within the building in response to a determination that the second signal characteristic is abnormal relative to the baseline signal characteristic; and trigger an alarm in response to detecting the event.

8. The system of claim 7, wherein the wireless signal is a frequency range compliant with IEEE 802.11 Wi-Fi communications specifications or IEEE 802.15.4-based specifications.

9. The system of claim 7, wherein the controller is further configured to:

identify a building location located between a first device from which the wireless signal is transmitted and a second device at which the wireless signal is received;

determine that the event is occurring within the building location.

10. The system of claim 7, wherein the second signal characteristic is determined to be abnormal relative to the baseline signal characteristic if the second signal characteristic comprises at least one of a degradation in signal strength, a degradation in link quality, or a degradation in bit rate relative to the baseline signal characteristic.

11. The system of claim 7, wherein the plurality of wireless devices are configured to:

observe the baseline signal characteristic and the second signal characteristic at a plurality of locations throughout the building; and transmit the baseline signal characteristic and the second signal characteristic observed at the plurality of locations to the controller.

12. The system of claim 7, wherein the controller comprises at least one of a building management system (BMS) controller or a fire system controller.

13. A method for detecting an event in or around a building, the method comprising:

recording a baseline signal characteristic that characterizes a wireless radio signal transmitted between transceivers of devices in or around the building during a baseline time period;

recording a second signal characteristic that characterizes the wireless radio signal during a second time period after the baseline time period;

detecting an event comprising at least one of a fire within the building or an increased level of water vapor within the building in response to a determination that the second signal characteristic is abnormal relative to the baseline signal characteristic.

14. The method of claim 13, wherein the wireless signal is within a frequency range compliant with IEEE 802.11 Wi-Fi communications specifications or IEEE 802.15.4-based specifications.

15. The method of claim 13, wherein detecting the event comprises:

identifying a building location located between a first device from which the wireless signal is transmitted and a second device at which the wireless signal is received;

determining that the event is occurring within the building location.

16. The method of claim 13, wherein the second signal characteristic is determined to be abnormal relative to the baseline signal characteristic if the second signal characteristic comprises at least one of a degradation in signal strength, a degradation in link quality, or a degradation in bit rate relative to the baseline signal characteristic.

17. The method of claim 13, further comprising:

observing the baseline signal characteristic and the second signal characteristic at a plurality of locations throughout the building; and transmitting the baseline signal characteristic and the second signal characteristic observed at the plurality of locations to a controller.

*18. A method for detecting an event in a space in or around a building, the method comprising:*

*recording a baseline signal characteristic that characterizes a wireless radio signal transmitted between transceivers of devices in the space during a baseline time period;*

*recording a second signal characteristic that characterizes the wireless radio signal during a second time period after the baseline time period;*

*detecting an event comprising at least one of a fire within the space or an increased level of water vapor within the space in response to a determination that the second signal characteristic is abnormal relative to the baseline signal characteristic; and*

*triggering an alarm in response to detecting the event.*

*19. The method of claim 18, wherein the wireless radio signal is within a frequency range compliant with IEEE 802.11 Wi-Fi communications specifications or IEEE 802.15.4-based specifications.*

*20. The method of claim 18, wherein detecting the event comprises:*

*identifying a location between a first device from which the wireless radio signal is transmitted and a second device at which the wireless radio signal is received;*

*determining that the event is occurring within the location.*

*21. The method of claim 18, wherein the second signal characteristic is determined to be abnormal relative to the baseline signal characteristic if the second signal characteristic comprises at least one of a degradation in signal strength, a degradation in link quality, or a degradation in bit rate relative to the baseline signal characteristic.*

*22. The method of claim 18, further comprising:*

*observing the baseline signal characteristic and the second signal characteristic at a plurality of locations throughout the space; and*

*transmitting the baseline signal characteristic and the second signal characteristic observed at the plurality of locations to a controller.*

*23. The method of claim 22, wherein the controller comprises at least one of a building management system (BMS) controller or a fire system controller.*

*24. A system for detecting an event within a space in or around a building, the system comprising:*

*a network comprising a plurality of devices distributed throughout the space and configured to:*

*record a baseline signal characteristic that characterizes a wireless radio signal transmitted between transceivers of the plurality of devices during a baseline time period;*

*record a second signal characteristic that characterizes the wireless radio signal during a second time period after the baseline time period;*

*a controller configured to:*

*detect an event comprising at least one of a fire within the space or an increased level of water vapor within the space in response to a determination that the second signal characteristic is abnormal relative to the baseline signal characteristic; and*

*trigger an alarm in response to detecting the event.*

*25. The system of claim 24, wherein the wireless radio signal is a frequency range compliant with IEEE 802.11 Wi-Fi communications specifications or IEEE 802.15.4-based specifications.*

*26. The system of claim 24, wherein the controller is further configured to:*

*identify a location between a first device from which the wireless radio signal is transmitted and a second device at which the wireless radio signal is received;*

*determine that the event is occurring within the location.*

*27. The system of claim 24, wherein the second signal characteristic is determined to be abnormal relative to the baseline signal characteristic if the second signal characteristic comprises at least one of a degradation in signal strength, a degradation in link quality, or a degradation in bit rate relative to the baseline signal characteristic.*

*28. The system of claim 24, wherein the plurality of devices are configured to:*

*observe the baseline signal characteristic and the second signal characteristic at a plurality of locations throughout the space; and*

*transmit the baseline signal characteristic and the second signal characteristic observed at the plurality of locations to the controller.*

*29. The system of claim 24, wherein the controller comprises at least one of a building management system (BMS) controller or a fire system controller.*

*30. A method for detecting an event in a space in or around a building, the method comprising:*

*transmitting a first wireless radio signal through the space during a first time period;*

*transmitting a second wireless radio signal through the space during a second time period after the first time period;*

*detecting an event that causes degradation of wireless radio signals within the space in response to a determination that a second signal characteristic of the second wireless radio signal is abnormal relative to a first signal characteristic of the first wireless radio signal, wherein the event comprises at least one of a fire within the space or an increased level of water vapor within the space.*

*31. The method of claim 30, wherein at least one of the first wireless radio signal or the second wireless radio signal is within a frequency range compliant with IEEE 802.11 Wi-Fi communications specifications or IEEE 802.15.4-based specifications.*

*32. The method of claim 30, wherein detecting the event comprises:*

*identifying a location between a first device from which the second wireless radio signal is transmitted and a second device at which the second wireless radio signal is received;*

*determining that the event is occurring within the location.*

*33. The method of claim 30, wherein the second signal characteristic is determined to be abnormal relative to the first signal characteristic if the second signal characteristic comprises at least one of a degradation in signal strength, a degradation in link quality, or a degradation in bit rate relative to the first signal characteristic.*

*34. The method of claim 30, further comprising:*

*observing the first signal characteristic and the second signal characteristic at a plurality of locations throughout the space; and*

*transmitting the first signal characteristic and the second signal characteristic observed at the plurality of locations to a controller.*

* * * * *